UNITED STATES PATENT OFFICE 2,630,940

LIQUID OR GAS DISPENSING AND MEASURING APPARATUS

Louis Auguste Carriol, La Courneuve, and Jean Gustave Antoine Marie Joseph Meyer, Neuilly-sur-Seine, France, assignors to S. A. T. A. M. Societe Anonyme Pour Tous Appareillages Mecaniques, La Courneuve, France Application June 8, 1945, Serial No. 598,324
In France February 4, 1942

Section 1, Public Law 690, August 8, 1946
Patent expires February 4, 1962

2 Claims. (Cl. 222—22)

This invention relates to improvements in apparatus for measuring and dispensing fluid of the type in which the operator can regulate or control the flow by means of a throttle member or valve generally set inside a terminal dispensing nozzle at the end of a delivery pipe, the reducing of the flow below a certain predetermined value actuates means for causing automatically the closure of a main valve set upstream of the said throttle member.

Figure 1:
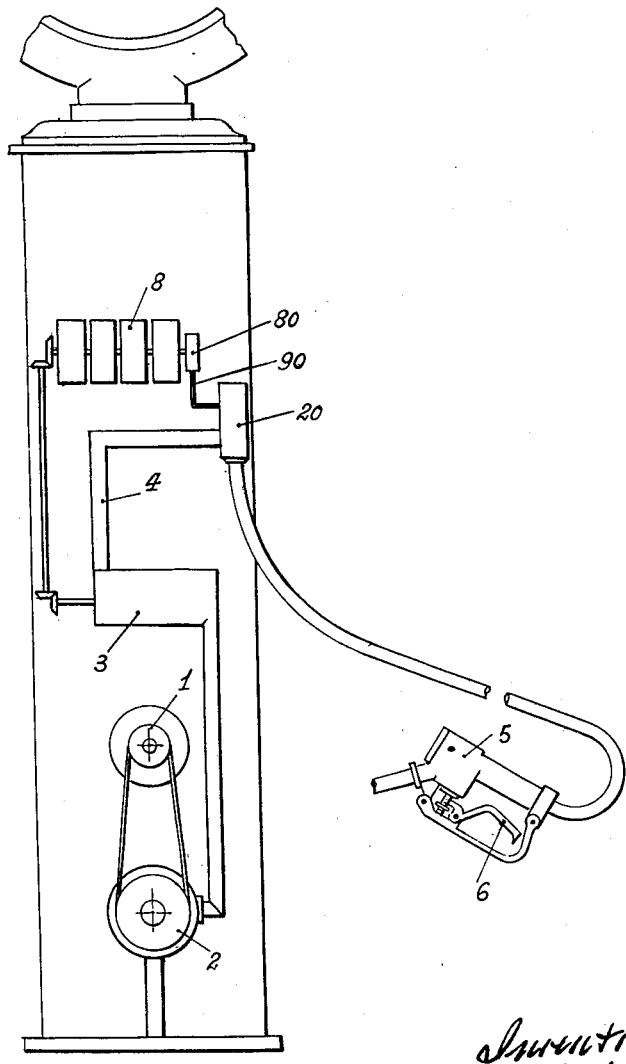
Figure 2:
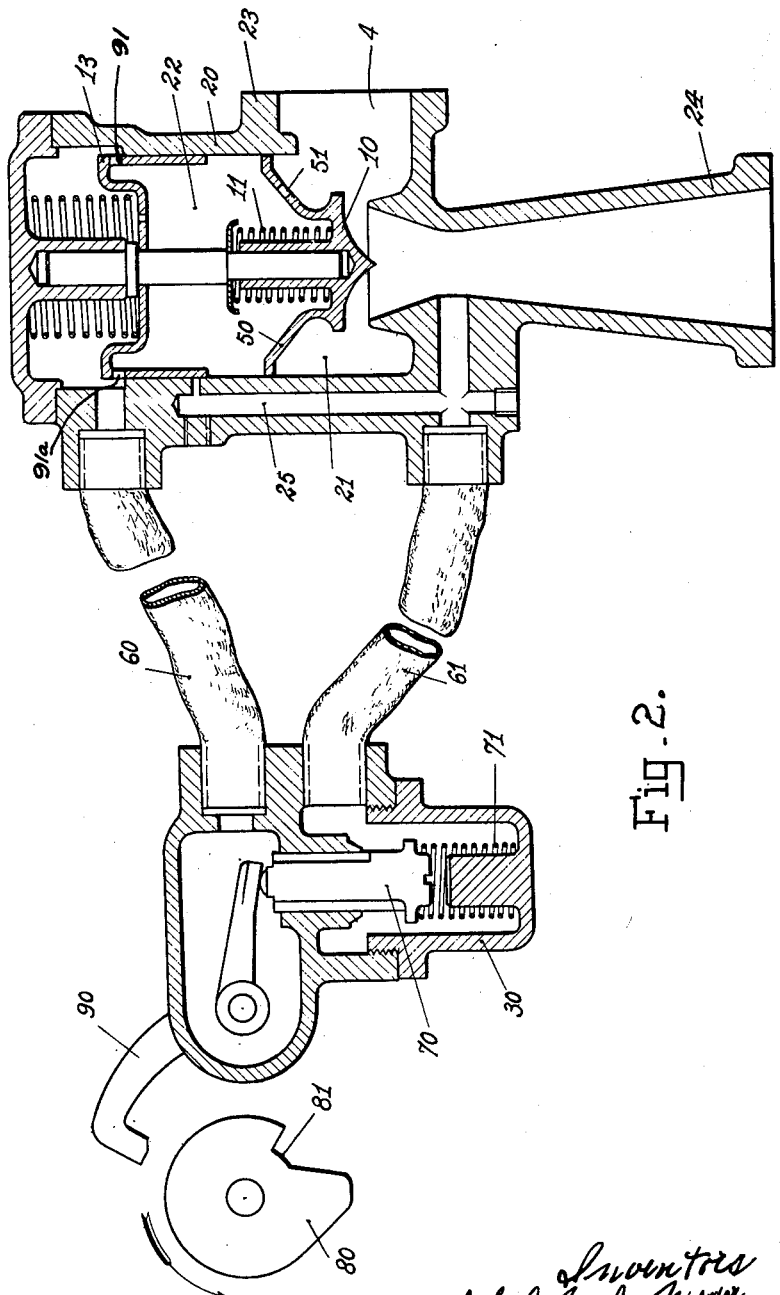

By way of example, the annexed drawing shows:

In Fig. 1, a diagrammatic view of a measuring and dispensing apparatus according to the invention and in Fig. 2, a view of parts of the apparatus of Fig. 1.

As shown in Figs. 1 and 2 the device comprises the construction of a pressure-controlled fluid measuring and dispensing device comprising a main valve 10 in a main dispensing conduit 4, a first bypass 61 to said main dispensing conduit, said main valve provided with spring-closing means, a dashpot 20 divided at its upper portion into two upper chambers 22 and 92 and a lower chamber 21 by a piston 13 responsive to the separate fluid pressures in said chambers, communicating ports 91 and 91a in the chambers in said dashpot which are connected to said first bypass, a second bypass 25 to bypass said main valve, an auxiliary control valve 70 in said first bypass to control the flow therein, an indicating means 8 provided with a rotating cam 80 and a lever 90 actuated by said cam, said cam and lever being so constructed and arranged to stop on a unit amount of fluid delivered by the device, and a venturi 24 in said main dispensing conduit downstream of said main valve in communication with said auxiliary valve, whereby the flow of fluid in said main dispensing conduit above a predetermined value causes a sufficient suction in said venturi to maintain said auxiliary valve in open position until said cam and lever come to a stopping position to reduce the flow in said main valve, and thereafter diminish the suction in said venturi to cause the spring closing means to close said main valve.

As shown in Figs. 1 and 2 the liquid measuring and dispensing apparatus comprises a motor 1 driving a pump 2 which drives the liquid to be dispensed, that comes from a tank not shown, first into a measuring device 3, then into a delivery pipe 4. This pipe can be stopped by a valve 10 (Figure 2) in a valve box 20 and controlled by the operator by a throttle member and placed inside a nozzle 5 set on the end of the delivery pipe 4. The throttle-member can be driven by the operator, by means of a catch 6, particularly into three positions: the first one corresponding to the normal flow, the second one to a reduced flow, through the action of which the valve 10 closes up and the third position corresponding to the stoppage of the delivery, a dashpot or box 20 formed by a piston 13 dividing the upper portion of the valve box into two compartments connected by narrow orifices 91 and 91a provided in the piston 13 and by a spring 72. The action of the latter upon the piston 13 is lightened by the resistance that the fluid encounters in passing through said hole of said lower compartment to said upper compartment.

In the measuring devices, the number 10 designates the valve which controls the flow of the apparatus, 20 the box into which has been placed the said valve; 23 the junction pipe through which the liquid enters this dashpot 24, the venturi leading from the dashpot 50, a pressure sensitive member cooperating with the valve 10 and separating the inside of the dashpot or box 20 into two chambers, the one chamber 21 through which the liquid passes to the valve 10 and the other chamber 22 placed on the other side of the member 50; 51 an orifice with a small diameter connecting both faces of said member 50, 30 a flap-valve box, 60 a pipe connecting the chamber 22 to the flap-valve box 30, 61 a pipe connecting the latter to the part of the pipe that is below the valve 10, 70 a flap-valve able to stop the by-pass constituted by the orifice 51 and the pipes 60 and 61 and connecting the parts of the pipe 4 above and below the valve 10, 80 the cam of the indicating device 8 (for example the cam 80 is fixed to the drum at the right of the indicator device 8), 81 a notch of that cam corresponding to the passage of the indicating device 8 through the position of the zero-position 90, the lever cooperating with said cam 80 and with the rod of the flap-valve 70, and 72 a spring weighing upon a secured part of the box 20 thereby tending to bring the valve 10 into its closure position.

In the case shown in Fig. 2 the apparatus operates as follows:

(a) *The no delivery position*

The valve 10 and the auxiliary control or flap-valve 70 are closed up. The parts above and below the valve 10 are now in communication with each other through the path of the orifice 51, the orifice 91, the duct 25, the orifice 91a and the pipe venturi 24.

(b) The opening of the nozzle 5

In this case, the liquid flows through the duct 25; this permits the starting of the indicating device 8 and particularly the rotation of the cam in housing 80. The lever 90 is consequently removed from the position shown on the annexed drawing; this permits the rising of the flap-valve 70. The latter movement causes the opening of a bypass formed by the orifices 51, the pipes 60 and 61, the chamber 22 and the orifice 14. The flow increases. After awhile, the differences between the pressure that exists on the two faces of the member 50 reach such a size that the said member 50 rises up and permits the opening of the valve 10. The flow of the apparatus now reaches its normal value.

(c) The crossing of the zero-position of the indicating device

The lever 90 falls into the notch 81, but the flap-valve 70 is kept open by the suction in the pipe 61, by the passage of the liquid through the junction pipe 24 that is the venturi. Therefore the flow is not changed by the passage to zero of the indicating device 8.

(d) The partial throttling of the opening of the nozzle 5

The closure of the valve 10 has no mechanical connection on the lever 90, which is already leaning on the periphery of the cam 80. The flap-valve 70 closes through the action of its spring 71 when the lever 90 falls into the notch 81 except as above. The piston 13 stops the bypass in duct 25. Any liquid flow is then stopped until the orifice 14 of the dashpot 13 comes before the opening of the bypass in the duct 25 and restores the communication of the faces that are below and above the valve 10.

The present invention is not only applicable to the liquid measuring and dispensing apparatus but also to the dispensing of fluids, broadly.

Having thus disclosed the invention, what is claimed is:

1. A pressure-controlled fluid measuring and dispensing device comprising a main valve in a main dispensing conduit, a first bypass to said main dispensing conduit, said main valve provided with spring-closing means, a piston of larger cross section than the cross section of said main valve integral with said main valve, one of the faces of said piston subjected to the action of the pressure in the main conduit above the main valve to urge said main valve into open position, the other of the faces of said piston subjected to the pressure above the first bypass to urge the main valve into closed position, communicating ports from said front bypass to said main valve, a second bypass to bypass said main valve, an auxiliary control valve in said first bypass to control the flow therein, an indicating means provided with a rotating cam and a lever actuated by said cam, said cam and lever being so constructed and arranged to stop on a unit amount of fluid delivered by the device and a venturi in said main dispensing conduit downstream of said main valve in communication with said auxiliary valve, whereby the flow of fluid in said main dispensing conduit above a predetermined value causes a sufficient suction in said venturi to maintain said auxiliary valve in open position until said cam and lever come to a stopping position to reduce the flow in said main valve, and following the reduced flow to cause the suction to diminish in said venturi to cause the spring closing means to close said main valve.

2. A pressure-controlled fluid measuring and dispensing device comprising a main valve in a main dispensing conduit, a first bypass to said main dispensing conduit, said main valve provided with spring closing means, a piston of larger cross section than the cross section of said main valve integral with said main valve, one of the faces of said piston subjected to the action of the pressure in the main conduit above the main valve to urge said main valve into open position, the other of the faces of said piston subjected to the pressure above the first bypass to urge the main valve into closed position, communicating ports from said front bypass to said main valve, a second bypass to bypass said main valve, an auxiliary control valve in said first bypass to control the flow therein, an indicating means provided with a rotating cam and a lever actuated by said cam, said cam and lever being so constructed and arranged to stop on a unit amount of fluid delivered by the device and a venturi in said main dispensing conduit downstream of said main valve in communication with said auxiliary valve, whereby the flow of fluid in said main dispensing conduit above a predetermined value causes a sufficient suction in said venturi to maintain said auxiliary valve in open position until said cam and lever come to a stopping position to reduce the flow in said main valve, and following the reduced flow to cause the suction to diminish in said venturi to cause the spring closing means to close said main valve, and a manually operated valve means to throttle the fluid flow ahead of said main valve in said main dispensing conduit.

LOUIS AUGUSTE CARRIOL.
JEAN GUSTAVE ANTOINE MARIE
JOSEPH MEYER.

REFERENCES CITED

The following references are of record in the file of this patent:

UNITED STATES PATENTS

| Number | Name | Date |
|---|---|---|
| 1,754,589 | Wydler | Apr. 15, 1930 |
| 1,919,828 | Cosby | July 25, 1933 |
| 2,057,333 | Guibert | Oct. 13, 1936 |
| 2,089,724 | Wydler | Aug. 10, 1937 |
| 2,302,201 | Fraser | Nov. 17, 1942 |